(12) United States Patent
Mosler et al.

(10) Patent No.: US 9,073,640 B2
(45) Date of Patent: Jul. 7, 2015

(54) DISPOSITION ZONE IN AN AIRCRAFT PASSENGER CABIN

(75) Inventors: Michael Mosler, Plaisance du Touch (FR); Jovan Ulbrich-Gasparevic, Pinneberg (DE); Matthias Breuer, Hamburg (DE)

(73) Assignee: Airbus Operations GmbH (DE)

( * ) Notice: Subject to any disclaimer, the term of this patent is extended or adjusted under 35 U.S.C. 154(b) by 338 days.

(21) Appl. No.: 12/999,649

(22) PCT Filed: Jun. 29, 2009

(86) PCT No.: PCT/EP2009/058118
§ 371 (c)(1),
(2), (4) Date: Dec. 17, 2010

(87) PCT Pub. No.: WO2010/000700
PCT Pub. Date: Jan. 7, 2010

(65) Prior Publication Data
US 2011/0114788 A1    May 19, 2011

Related U.S. Application Data

(60) Provisional application No. 61/133,458, filed on Jun. 30, 2008.

(30) Foreign Application Priority Data

Jun. 30, 2008 (DE) .......................... 10 2008 031 021

(51) Int. Cl.
*B64D 13/00* (2006.01)
*B64D 11/00* (2006.01)

(52) U.S. Cl.
CPC .................................. *B64D 11/0023* (2013.01)

(58) Field of Classification Search
USPC ........................ 244/118.5, 121, 129.4, 129.5
See application file for complete search history.

(56) References Cited

U.S. PATENT DOCUMENTS

| 4,913,487 A | | 4/1990 | Breckel et al. |
| 5,024,398 A | * | 6/1991 | Riedinger et al. ......... 244/118.5 |
| 5,556,332 A | | 9/1996 | Schumacher |
| 5,687,513 A | * | 11/1997 | Baloga et al. ..................... 52/32 |
| 6,520,451 B1 | * | 2/2003 | Moore ....................... 244/118.5 |
| 7,364,119 B2 | * | 4/2008 | Sprenger et al. ........... 244/118.6 |
| 2003/0104907 A1 | | 6/2003 | Sankrithi |
| 2004/0025447 A1 | | 2/2004 | Shima et al. |

(Continued)

FOREIGN PATENT DOCUMENTS

| DE | 4301681 C1 | 10/1994 |
| DE | 19926782 A1 | 12/2000 |

(Continued)

*Primary Examiner* — Brian M O'Hara
*Assistant Examiner* — Keith L Dixon
(74) *Attorney, Agent, or Firm* — Lerner, David, Littenberg, Krumholz & Mentlik, LLP

(57) ABSTRACT

The invention pertains to an aircraft with at least one passenger cabin that comprises at least one door entry area for the passengers and for the flight attendants that is visually separated from the passenger cabin and referred to as a space unit. Variable or mobile elements assigned to at least one partition wall/one monument of the space element can be arranged in the space unit that can be used as a disposition zone during the flight phase in order to realize working areas or service and/or comfort facilities for passengers or for the flight attendants.

14 Claims, 5 Drawing Sheets

(56) References Cited

U.S. PATENT DOCUMENTS

| | | |
|---|---|---|
| 2005/0087650 A1 | 4/2005 | Quan et al. |
| 2006/0058107 A1 | 3/2006 | Dobertin et al. |
| 2006/0060704 A1 | 3/2006 | Lavie et al. |
| 2006/0220425 A1 | 10/2006 | Becker et al. |
| 2007/0035919 A1 | 2/2007 | Doebertin et al. |
| 2007/0159035 A1 | 7/2007 | Mullen |

FOREIGN PATENT DOCUMENTS

| | | |
|---|---|---|
| DE | 10259122 A1 | 7/2004 |
| DE | 10309980 A1 | 9/2004 |
| DE | 102005043610 A1 | 3/2007 |
| EP | 1106502 A1 | 6/2001 |
| EP | 1350454 A1 | 10/2003 |
| EP | 1471001 A1 | 10/2004 |

* cited by examiner

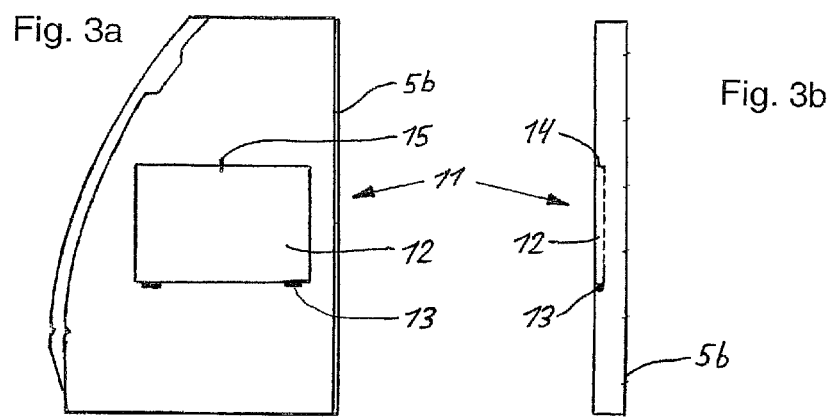
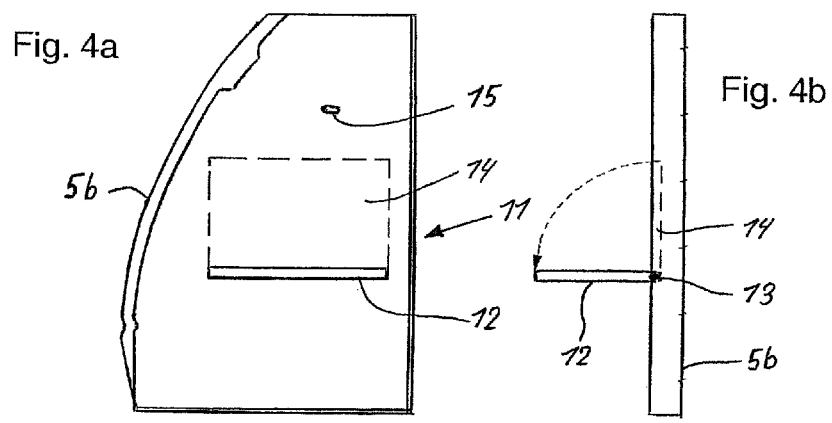
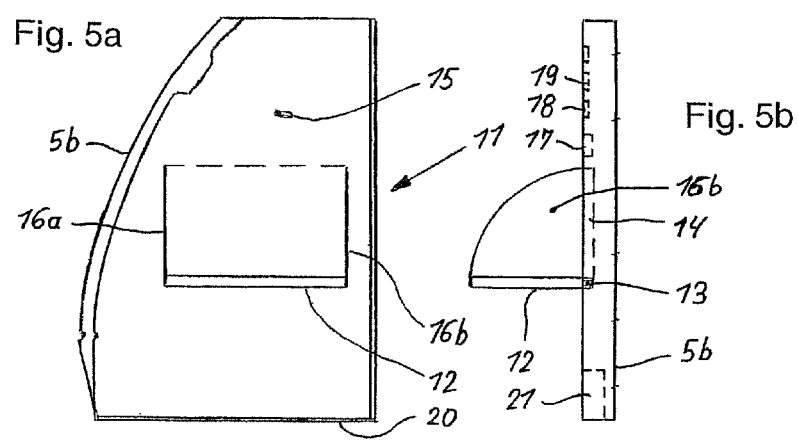

Fig. 6
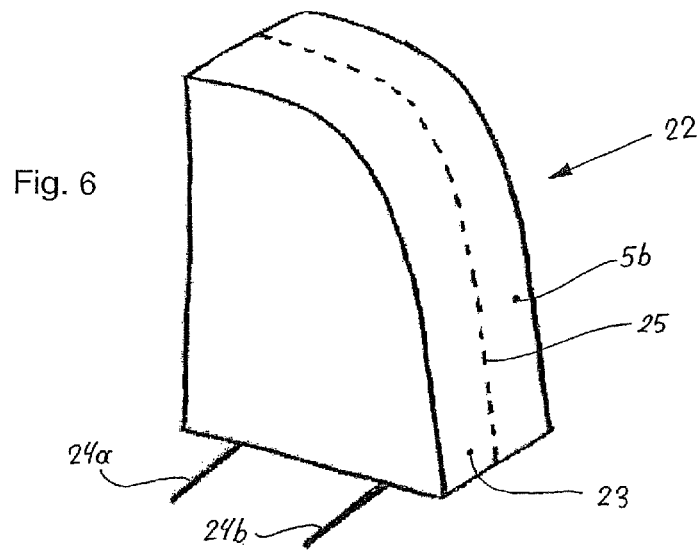
Fig. 7a  Fig. 7b  Fig. 7c
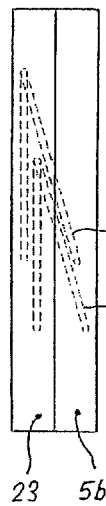 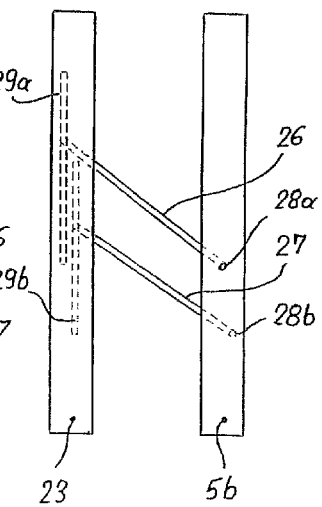 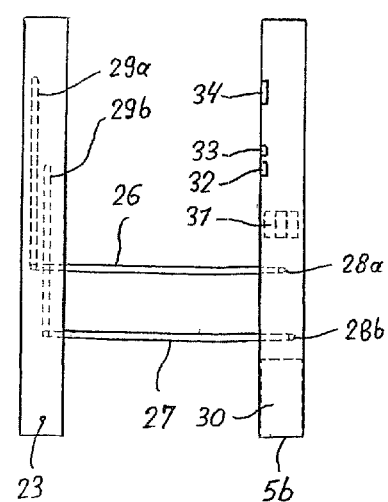

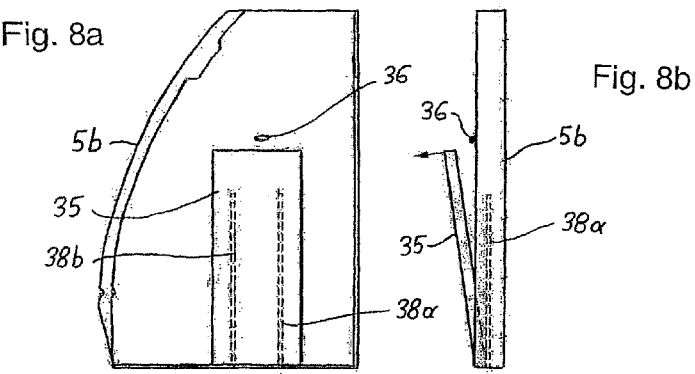
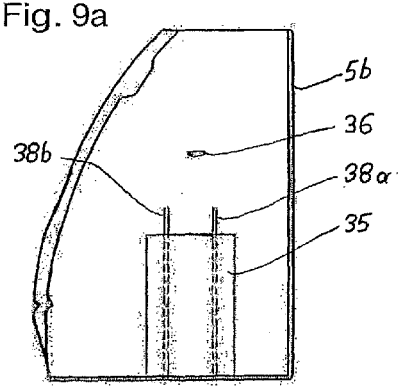
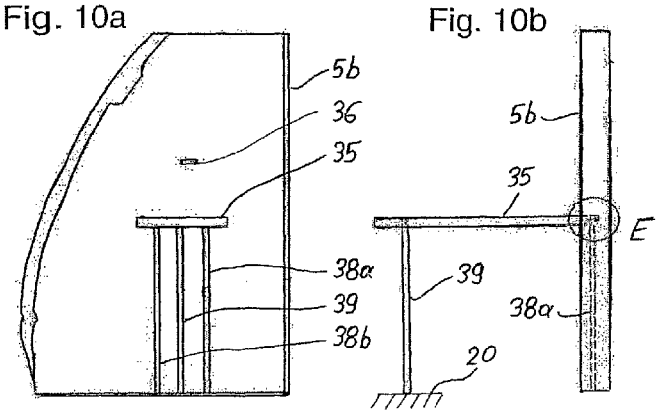

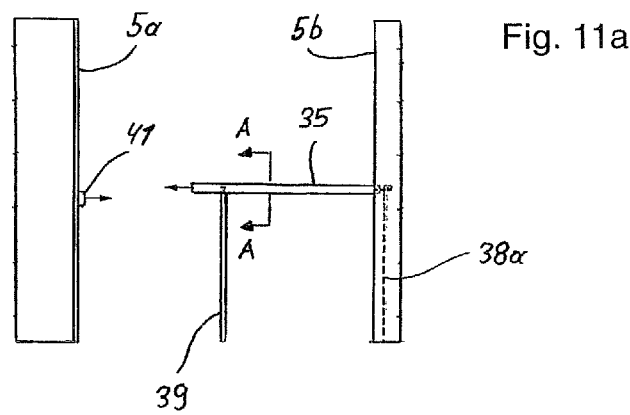
Fig. 11a
Fig. 11b
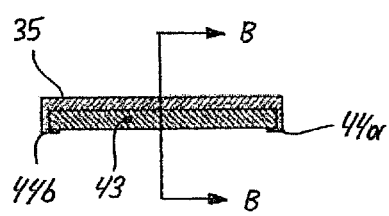
Fig. 11c
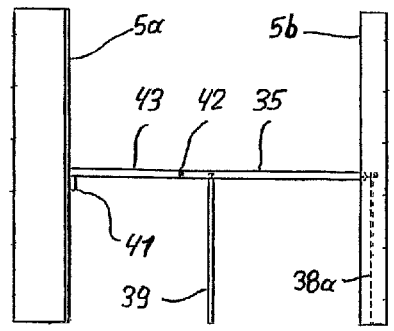
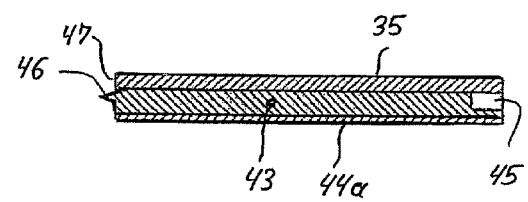
Fig. 11d

DISPOSITION ZONE IN AN AIRCRAFT PASSENGER CABIN

CROSS-REFERENCE TO RELATED APPLICATIONS

This application is a national phase entry under 35 U.S.C. §371 of International Application No. PCT/EP2009/058118, filed Jun. 29, 2009, published in German, which claims the benefit of the filing date of German Patent Application No. 10 2008 031 021.2 filed Jun. 30, 2008, and of U.S. Provisional Patent Application No. 61/133,458 filed Jun. 30, 2008, the disclosures of which applications are hereby incorporated herein by reference.

FIELD OF THE INVENTION

The invention pertains to an aircraft with at least one passenger cabin comprising at least one door entry area or door exit area for the passengers and for the flight attendants that is visually separated from the passenger cabin and referred to as a space unit.

TECHNOLOGICAL BACKGROUND

In order to meet the requirements in the context of new developments of aircraft and the demands in the near future, it is necessary to improve the service and the comfort and to equip aircraft, for example, with Working Areas.

DE 43 01 681 C1 discloses a service unit in the form of a so-called PSU module (Passenger Service Unit) for aircraft, in which, for example, reading lamps, information signs, loudspeakers, seat row numbering, optical safety information and an attendant call button (Attendant Call Button) are combined. These PSU are usually arranged above the rows of passenger seats. DE 199 26 782 A1 pertains to a service unit that is positioned on a side wall paneling and intended for a separate space such as, for example, a sleeping compartment in an aircraft. This service unit comprises display devices such as information displays, by means of which the passenger can be informed. According to DE 10 2005 043 610 A1, as a service offered to the passengers a modular monument is arranged in the passenger cabin of an airplane that offers the passenger animation elements such as, for example, television or internet access. In addition, the monument may be operated by external enterprises in connection with franchising agreements for services in the form of beverage or snack vending machines. The floor space required for the module disadvantageously reduces the passenger space.

The use of mobile telephones within aircraft was prohibited during the flight. Consequently, it was necessary to wait until after the landing, or special telephones that were associated with high fees had to be used. Due to new technical processes and amended aviation laws, the passenger is able to make telephone calls from an aircraft with a mobile telephone as of 2009. The working conditions in Business Class seats are frequently restricted due to the space conditions. Working effectively is impossible in the Tourist Class, wherein the background noise caused by fellow passengers is also distracting. Another disadvantage in both classes is that confidential documents being worked on are not protected from the prying eyes of fellow travelers. In passenger cabins of airplanes, the available space is relatively limited for economical reasons. Until now, the entry area was only used for boarding and deboarding the aircraft, as well as for the catering service. The entry area remains unused during the actual flight phase. The disadvantage of conventional cabins is that a relatively large space which is only used briefly in comparison with the total time spent by passengers in the passenger cabin needs to be made available for the predominantly separated entry areas.

SUMMARY OF THE INVENTION

It is the objective of the present invention to improve the services and comfort offered to the flight passengers by utilizing the space in the passenger cabin or the door entry area that is otherwise not used while cruising.

This problem is solved with the features of claims 1 and 14. Advantageous embodiments and additional developments of the invention and of the method according to the invention are disclosed in the respective dependent claims.

According to one advantageous exemplary embodiment of the present invention disclosed in claim 1, different working areas for various uses can be created during the flight phase in the space unit that forms a disposition zone by flexible, variable or mobile elements or devices. The movable elements assigned to at least one monument or one partition wall of the space unit preferably make it possible to realize service and/or comfort facilities for the passengers or flight attendants. The use of the entry area, i.e., a section that was not used so far, as a disposition zone while cruising therefore represents additional space gained. The space unit forming a disposition zone advantageously does not require any additional structural space in the passenger cabin because it can be implemented in an existing entry and exit area that is not used or forms a dead space while cruising.

In addition, the invention advantageously makes it possible to achieve a greater cabin variability without loss of usable seat capacity. It is advantageous that no space segments of the passenger cabin need to be made available for realizing the service or comfort facilities according to the invention. Consequently, the space unit designed in the form of a disposition zone can be realized without changing the cabin configuration. The invention simultaneously improves, in particular, the choice of zones, in which the passenger can pursue a personal activity in an undisturbed fashion. Alternatively, the disposition zone may be designed in the form of an additional work space for the flight attendants, for example, in order to prepare meals for the passengers at this location. The movable or mobile elements for realizing the inventive working areas or service and/or comfort facilities are arranged and locked or secured while cruising in such a way that they also remain in their respective functional position if turbulences of the aircraft occur. On the other hand, the variable devices or elements are arranged in the space unit such that they are placed in a space-saving and secure fashion during the takeoff and landing phase of the aircraft, in which the passengers need to remain in their seats for safety reasons. Due to the compact design and individual collapsible or folding elements, an unobstructed entry and exit of the passengers is furthermore ensured.

The advantages attained with the invention furthermore can be seen in that an airline can be provided with multifunctional disposition zones that can be quickly and easily designed for various purposes in dependence on the respective requirements. The inventive measures, to be classified as a building block of the "Cabin Flexibility Concept", advantageously can be cost-efficiently realized and also used in the form of a retrofitted solution. The invention can be realized by a modular system that can be easily adapted to the needs of the respective aircraft type, the technology and the airline. The inventive space unit that can be used as a disposition zone can be advantageously converted from a closed into an open position with a few manipulations in order to use the facilities. If so required, more than one inventive space unit can be placed in an aircraft. Depending on the respective requirements, the airline also has the option of providing space units designed in accordance with the invention in different sections of the passenger cabin or decks of the aircraft.

According to another advantageous exemplary embodiment of the present invention, the space unit is realized in the form of a calling zone or communication area, in which a passenger can make telephone calls during the flight in an undisturbed fashion without fellow travelers overhearing confidential conversations or disturbing fellow travelers with telephone conversations. The space unit that can be used as a calling zone improves the cabin usability with respect to the cabin variability and simultaneously the additional services for the air travelers. The invention provides the passenger with the option of using the mobile telephone in an undisturbed fashion in connection with improved privacy, wherein the remaining passengers are not disturbed by the use of the telephone.

According to another advantageous exemplary embodiment of the present invention, an extendable module that represents a screen and can be pivoted about a pivoting axis is integrated into a partition wall or a monument of the space unit in order to realize the inventive calling zone. An elastic, foldable material is provided for the screen, wherein this material is stretched or tightened in connection with support or frame elements that are preferably manufactured of CFRP. A curtain material is preferably used for the screen that encloses a circular arc of approximately 90° when the calling zone is closed, wherein the material used needs to fulfill the criteria with respect to flame-resistant materials according to fire classification B1 (DIN 4102).

According to another advantageous exemplary embodiment of the present invention, a fold-out desktop is integrated into a partition wall or into a monument of the space unit in order to realize an office unit, wherein said desktop can be folded out by a hinge in order to create a work space. When the desktop is not in use, it is advantageously arranged in the partition wall or the monument flush with the surface thereof. In addition, a power outlet, and internet connection for a laptop and a waste paper basket are provided in the partition wall or the monument within reach of the person that is preferably seated in the office unit. It is furthermore possible to equip the office unit with an attendant call button, a reading light and air nozzles. In order to improve the privacy, a supplementary privacy screen of fabric or plastic that is integrated into a partition wall or into a monument of the space unit may be assigned to the desktop. The privacy screen that advantageously tightens synchronously to folding out the desktop, particularly in accordance with the fan principle, makes it possible to securely work on confidential documents.

According to another advantageous exemplary embodiment of the present invention, a partition wall or a monument of the space unit is composed of two parts in order to realize an office module. A desktop, as well as a simultaneously extending seat device, is arranged in a displaceable lateral part that forms a mobile wall such that these components automatically assume a working position, in which they connect the partition wall and the mobile wall, in an extended position of the mobile wall. The seat device, as well as the desktop, can be vertically adjusted in order to be adapted to different body sizes. The office module arranged in the space unit creates an advantageously quiet working atmosphere while simultaneously providing a generous amount of space and improving the service and the comfort for business travelers in the Business Class and the Tourist Class. Other elements of the office module such as a shelf, a waste paper basket with or without integrated shredder, a power outlet and an internet connection are preferably arranged in the partition wall of the space unit. If so required, the office module may also be equipped with a computer, particularly a laptop. The mobile wall and the partition wall that foam the lateral boundaries of the office module provide effective protection from prying eyes. The inventive office module furthermore provides the option of realizing a desktop with two separate desk areas.

Consequently, it is possible to variably utilize the otherwise unused space unit in a door entry area. The office module advantageously includes different safety devices such as an attendant call button (Attendant Call Button) or an optical information display (Return to Seat Sign). A safety belt is assigned to the seat device in order to sufficiently secure the user of the office module during suddenly occurring turbulences during the flight phase, i.e., while cruising. After the office module has been used, the mobile wall can be displaced into the original position against the partition wall or the monument manually and, as far as possible, without auxiliary means.

According to another advantageous exemplary embodiment of the present invention, the space unit is designed in the form of a work space for the flight attendants or the flight crew. According to previous solutions, Folding Shelves were arranged, for example, between two monuments in the form of loose parts and stowed in a separate stowage space after use. According to the invention, an Integrative Folding Shelf application is provided, wherein the Folding Shelf that fulfills the function of a Working Table or a desktop is integrated into a partition wall or a monument of the space unit and can be folded out on demand. When it is not in use, the Folding Shelf that is guided on rails of the partition wall with its end is folded in and fitted into the partition wall flush with the surface thereof. In order to be adjusted to the desired working height, the Folding Shelf is displaced in the Z-direction along a rail until the desired working height is reached and locked in the end position. A support that is assigned to and supports the Folding Shelf on the cabin floor may also be folded out for stabilization purposes. The inventive solution concept that does not require an adaptation of the cabin layout improves and simplifies the handling of the Folding Shelf that can be quickly and securely installed. The inventive Folding Shelf may furthermore be used in the form of a retrofitted solution.

According to another advantageous exemplary embodiment of the present invention, an extendable Folding Shelf that is composed of two layers is provided. In this case, a linearly extendable auxiliary element that spans the distance between both partition walls of the space unit is integrated into the Folding Shelf. The guidance and arrangement of the auxiliary element in the Folding Shelf is realized such that neither a wide gap nor an offset in height or a step is created between the two components.

According to another advantageous exemplary embodiment of the present invention, the space unit is realized in the form of a modular interior fittings building block that can be used for different aircraft types. According to the invention, the concept that can also be referred to as a modular system advantageously can be generally used for several types of aircraft that, for example, have different passenger cabin layouts. The modular design allows the manufacturing of space units or corresponding components in large quantities and therefore results in a reduction of the costs per unit.

According to another advantageous exemplary embodiment of the present invention, all variable or mobile elements for realizing Working Areas or service and/or comfort facilities are equally structured and/or designed in the same color in order to achieve a uniform spatial impression in the region of the space unit. This measure supports a uniform optical appearance of the door entry area that is referred to as a space unit. On the other hand, an attractive space unit and a positive cabin feature can be achieved, according to the invention, by a corresponding color design or adaptation, for example, of the desktop of an office unit.

According to an advantageous exemplary embodiment of the present invention disclosed in claim 14, a method for designing a door entry area that is visually separated from a passenger cabin of an aircraft and referred to as a space unit is proposed. For this purpose, elements that can be used in a flexible, variable or mobile fashion and that are assigned to at least one lateral partition wall or a monument, are arranged in the space unit. These elements serve for creating Working Areas that are realized in the form of service and/or comfort facilities and intended for passengers or flight attendants.

A fold-out calling unit may be provided in order to ensure privacy during telephone calls. A fold-out desktop may be provided in order to work in complete privacy.

BRIEF DESCRIPTION OF THE FIGURES

Advantageous exemplary embodiments of the present invention are described below with reference to the enclosed figures. In these figures:

FIG. 3a shows a front view of a partition wall with integrated desktop in the form of an office unit;

FIG. 3b shows a side view of the partition wall according to FIG. 3a;

FIG. 4a shows a front view of the partition wall according to FIG. 3a with folded-out desktop;

FIG. 4b shows a side view of the partition wall according to FIG. 4a;

FIG. 5a shows a partition wall according to FIG. 4a with lateral privacy screens;

FIG. 5b shows a side view of FIG. 5a;

FIG. 6 shows a perspective representation of an office module;

FIG. 7a shows the office module according to FIG. 6 in the form of a side view in the original position;

FIG. 7b shows the office module with a partially displaced mobile wall;

FIG. 7c shows the office module in an extended position;

FIG. 8a shows a front view of a partition wall with integrated fold-out Folding Shelf;

FIG. 8b shows a side view of FIG. 8a;

FIG. 9a shows a front view of a partially folded-out Folding Shelf;

FIG. 9b shows a side view of FIG. 9a;

FIG. 9c shows the detail "E" according to FIG. 9b in the form of an enlarged representation;

FIG. 10a shows the folded-out Folding Shelf in the form of a front view;

FIG. 10b shows a side view of FIG. 10a;

FIG. 10c shows the detail "E" according to FIG. 10b in the form of an enlarged representation;

FIG. 11a shows the folded-out Folding Shelf with a support in the form of a side view;

FIG. 11b shows the folded-out and extended Folding Shelf with support in the form of a side view;

FIG. 11c shows a section A-A through the Folding Shelf according to FIG. 11a; and FIG. 11d shows a section B-B through the Folding Shelf according to FIG. 11c.

DETAILED DESCRIPTION OF ADVANTAGEOUS EXEMPLARY EMBODIMENTS

In the description of FIGS. 1 to 11d, analogous or corresponding components and elements are at least in part identified by the same reference symbols. Furthermore, the uniform term space unit is used for the door entry area and door exit area of the passenger cabin.

Figure 1:
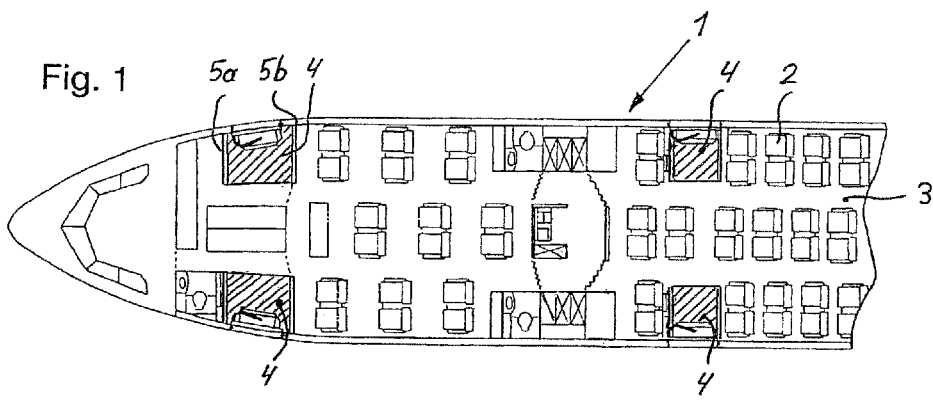
FIG. 1 shows a section of aircraft in the form of a sectional representation.

FIG. 1 shows the design of a section of an aircraft 1 in the form of a sectional representation and elucidates the seat layout of passenger seats 2 in a passenger cabin 3, as well as the arrangement or distribution of the door entry and door exit areas that are referred to as space units 4 and respectively illustrated in a hatched fashion. According to the invention, the space units 4 form disposition zones that can be used for different service and/or comfort facilities and also referred to as Working Areas. In this case, the space units 4 are laterally bounded by partition walls 5a, 5b that extend from a cabin floor up to a cabin ceiling.

Figure 2A:
FIG. 2a shows a side view of a partition wall that forms the lateral boundary of a space unit.
Figure 2B:
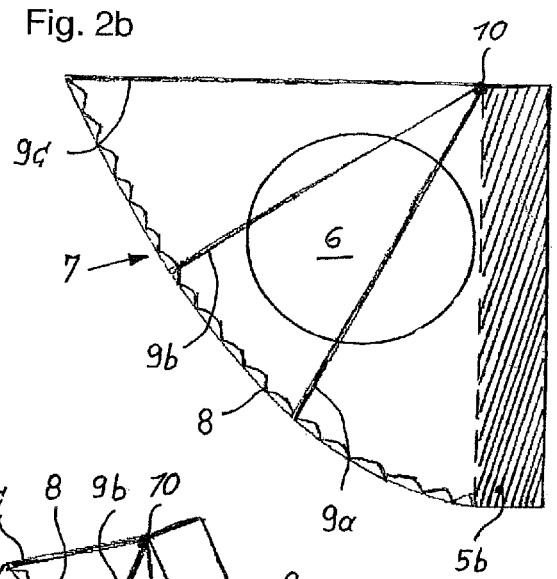
FIG. 2b shows a space unit designed as a calling zone in the form of a top view.
Figure 2C:
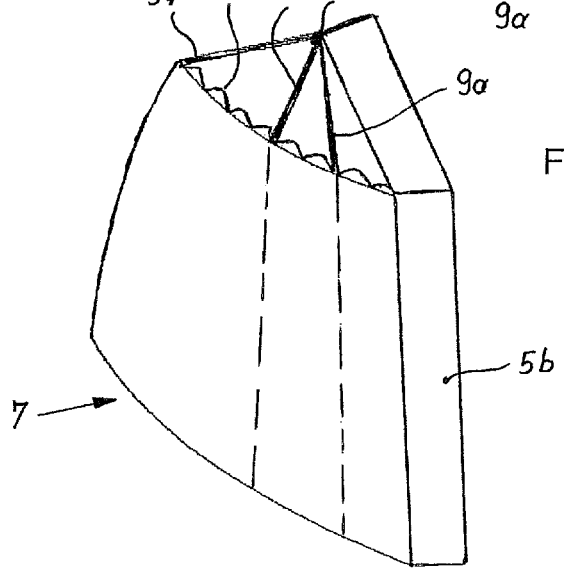
FIG. 2c shows an isometric view of the calling zone according to FIG. 2b.

FIGS. 2a to 2c show the design and the arrangement of a calling zone 6 that can also be referred to as a Communication Area and is that arranged in a space unit 4. FIG. 2a shows a top view of a partition wall 5b, in which an extendable or fold-out module 7 is integrated as shown in FIG. 2b. In the opened version, a screen 8 of the module 7 that is realized in the form of a curtain extends over nearly 90 degrees and encloses the calling zone 6 illustrated in the form of a circle. When the module 7 is extended, the screen 8 is tightened by frame elements 9a to 9c that can be pivoted about a pivoting axis 10. FIG. 2c shows the module 7 in connection with the partition wall 5 in the form of an isometric view.

An office unit 11 is illustrated in different positions and variations in connection with the partition wall 5b in FIGS. 3a to 5b. FIGS. 3a, 3b show a desktop 12 that is integrated into an integration support (a partition wall or partition or a monument such as, e.g., lavatory, galley, etc.) 5b. The integration support 5a comprises a recess 14 that corresponds to the surface of the desktop 12, wherein the desktop 12 is fitted into said recess flush with the surface of the integration support as shown in FIG. 3b. In the folded-in position, the desktop 12 that can be pivoted by a hinge 13 is secured with the aid of a lock 15.

FIGS. 4a, 4b show the office unit 11 in the form of a front view (FIG. 4a) and a side view (FIG. 4b), in which the desktop 12 is illustrated in a folded-out working position.

A variation of FIGS. 4a, 4b is illustrated in FIGS. 5a, 5b, in which the desktop 12 is bounded by a privacy screen 16a, 16b on both sides. According to one preferred design of the privacy screens 16a, 16b, they are realized in accordance with the fan principle, tighten synchronously to the pivoting motion of the desktop 12 and form an effective visual cover. A shelf 16, a power outlet 18 and an internet connection 19 are also provided in the partition wall 5b of the office unit 11 and a waste paper basket 21 is arranged in the region of the cabin floor 20.

FIG. 6 shows a perspective representation of an office module 22 that consists of an integration support (a partition wall or a monument such as a galley, lavatory, etc.) 5b, to which a mobile wall 23 realized in the form of a displaceable front side is assigned, wherein the outer contour of the mobile wall corresponds to the outer contour of the integration support 5b in order to create a uniform spatial impression. In this case, the mobile wall 23 can be displaced by floor rails 24a, 24b inserted into the cabin floor 20. In an original position of the office module 22, only a gap 25 is visible between the integration support 5b and the mobile wall 23 that can also be referred to as integration support front section.

FIGS. 7a to 7c show front views of the office module 22 with different positions of the mobile wall 23. FIG. 7a shows an original position of the mobile wall 23, in which the desktop 26 and the seat device 27 are illustrated in an angular arrangement with dot-dash lines. FIG. 7b shows the mobile wall 23 in a partially extended position relative to the stationary partition wall 5b, in which the desktop 26, as well as the seat device 27, is connected to the partition wall 5b by joints 28a, 28b that are respectively spaced apart from one another, as well as connected to the mobile wall 23 by longitudinal guides 29a, 29b.

According to FIG. 7c, the office module 22 comprises a desktop 26 that is arranged parallel to the seat device 27. In order to complete the office module 22 that forms a work space, a waste paper basket 30 is arranged in the partition wall 5b underneath the seat device 27 and a shelf 31, an internet connection 32 and a power outlet 33 are provided in that sequence above the desktop 26. It is also possible to equip the office module 22 with a safety device 34 that contains an attendant call button, as well as an optical information display (Return to Seat Sign).

FIGS. 8a to 11d show the design and the configuration of a work space within the space unit 4 that is intended, in particular, for the flight attendants, i.e., the flight crew of the aircraft. The drawings refer, in particular, to the arrangement and design of a Folding Shelf 35.

FIGS. 8a, 8b show the Folding Shelf 35 that can also be referred to as shelf or intermediate board in connection with the partition wall or monument 5b, wherein this shelf is arranged flush with a front side of the partition wall/the monument 5b in the original position. According to the side view 8b, the Folding Shelf 35 is folded out relative to the partition wall/the monument 5b by approximately 10 degrees after a locking lever 36 has been released.

FIGS. 9a to 9c show the Folding Shelf 35 in a position, in which it is inclined relative to the partition wall/the monument 5b by 45 degrees. FIG. 9c shows an enlarged representation of the detail "E," namely a hinge 37 that can be displaced in the Z-direction and makes it possible to vertically translate the Folding Shelf 35 in connection with spaced-apart rails 38a, 38b of the partition wall/the monument 5b until a working height is reached. This vertical translation may take place synchronously to another pivoting motion of the Folding Shelf 35 that is indicated with two arrows on the Folding Shelf 35 in FIG. 9b.

FIGS. 10a to 10c show different views of the Folding Shelf 35 in an end or working position. This position is reached after a locking lever 40 has been released and the Folding Shelf 35 locks in an end position after it has been folded out and displaced in the Z-direction. The position of the locking lever is elucidated in FIG. 10c, in which the detail "E" according to FIG. 10b is illustrated in an enlarged fashion. In order to further stabilize the Folding Shelf 35, it can be supported on the cabin floor 20 by a fold-out support 39 in the working position.

FIGS. 11a to 11d show other designs of a Folding Shelf 35 that can be extended from the partition wall 5b to the opposite partition wall 5a. The end of the extended Folding Shelf 35 is supported by a receptacle 41 assigned to the partition wall/the monument 5a as illustrated in FIG. 11a. FIG. 11b shows a Folding Shelf 35 that completely connects the partition walls/the monuments 5a, 5b such that a closed working surface that is only interrupted by a gap 42 is formed in connection with an auxiliary element 43. The design of the extendable Folding Shelf 35 is elucidated in the FIGS. 11c, 11d. A cross section of the Folding Shelf 35 in accordance with the line of section A-A in FIG. 11a is illustrated in FIG. 11c. According to this figure, the outside of the Folding Shelf 35 is bounded by two receptacles 44a, 44b, in which an auxiliary element 43 that extends the Folding Shelf 35 is guided in a longitudinally displaceable fashion. FIG. 11d shows the section B-B according to FIG. 11c and elucidates the receptacle 44a that extends over the entire length of the Folding Shelf 35, as well as the design of the end of the auxiliary element 43. The front side of the auxiliary element 43 features a centering 46, by which the auxiliary element 43 is positively fixed in the partition wall/the monument 5a in the region of the receptacle 41. On the side that lies opposite of the centering 46, the auxiliary element 43 fauns a recess 45, the geometric shape of which corresponds to the component thickness of the Folding Shelf 35. The recess 45 has the function of displacing the auxiliary element 43 in the vertical direction to a limited degree in connection, for example, with a spring element that is not illustrated in FIG. 11d or a restricted guidance when the positions of a front side 47 of the Folding Shelf 35 and of the recess 45 correspond in order to realize a transition without step in the region of the gap 42.

As a supplement, it should be noted that "comprising" does not exclude any other elements or steps, and that "a" or "an" does not exclude a plurality. It should furthermore be noted that characteristics that were described with reference to one of the above exemplary embodiments can also be used in combination with other characteristics of other above-described exemplary embodiments. Reference symbols should not be interpreted in a restrictive sense.

LIST OF REFERENCE SYMBOLS

1 Aircraft
2 Passenger seat
3 Passenger cabin
4 Space unit
5a Partition wall
5b Partition wall
6 Calling zone
7 Module
8 Screen
9a Frame element
9b Frame element
9c Frame element
10 Pivoting axis
11 Office unit
12 Desktop
13 Hinge
14 Recess
15 Lock
16a Privacy screen
16b Privacy screen
17 Shelf
18 Power outlet
19 Internet connection
20 Cabin floor
21 Waste paper basket
22 Office module
23 Mobile wall 24a Floor rail
24b Floor rail
25 Gap
26 Desktop
27 Seat device
28a Joint
28b Joint
29a Longitudinal guide
29b Longitudinal guide
30 Waste paper basket
31 Shelf
32 Internet connection
33 Power outlet
34 Safety device
35 Folding Shelf
36 Locking lever
37 Hinge
38a Rail
38b Rail
39 Support
40 Locking lever
41 Receptacle
42 Gap
43 Auxiliary element
44a Receptacle
44b Receptacle
45 Recess
46 Centering
47 Front side

The invention claimed is:

1. An aircraft having at least one passenger cabin comprising:
a door entry area or door exit area for passengers and for flight attendants to enter or exit the aircraft, the area being visually separated from the rest of the at least one passenger cabin; and
at least one multifunctional disposition zone,
the multifunctional disposition zone comprising the door entry area or door exit area and a module comprising at least one flexible, variable or mobile element assigned to at least one partition wall or monument in the multifunctional disposition zone, said module being integrated with at least one partition wall or monument,
wherein the module assumes at least one of a closed state and an open state;
wherein in the open state of the module, the door entry area or door exit area is used as the multifunctional disposition zone while cruising such that the module at least partly obstructs the entry and exit through the door entry area or door exit area, and the multifunctional disposition zone forms a plurality of different working areas configured in the form of service and/or comfort facilities for passengers or flight attendants during a flight phase;
wherein in the open state of the module, the multifunctional disposition zone is enclosed on one side by a door adjacent to the door entry area or door exit area; and
wherein in the closed state of the module, the at least one flexible, variable or mobile element is placed in a space-saving and secure fashion during takeoff and landing phases of the aircraft, and the multifunctional disposition zone forms an unobstructed entry and exit for the passengers and for flight attendants into and out of the aircraft.

2. The aircraft of claim 1, wherein in the open state the at least one multifunctional disposition zone provides a calling zone or communication area and, said module including an extendable screen pivotable about a pivoting axis.

3. The aircraft of claim 2, wherein the screen of the module is stretched or tightened by at least one frame element and pivoted by approximately 90° when the calling zone is closed.

4. The aircraft of claim 3, wherein the screen of the module is made of a flame-resistant elastic material.

5. The aircraft of claim 1, wherein the module comprises a fold-out desktop integrated into the at least one partition wall or monument of the space unit to form an office unit.

6. The aircraft of claim 5, wherein the office unit comprises a desktop fitted flush with a surface of the at least one partition wall or monument and pivotable by a hinge, and
wherein the office unit comprises at least one movably arranged privacy screen, a power outlet and an internet connection.

7. The aircraft of claim 1, wherein the at least one partition wall or monument of the space unit is divided to form an office module having a desktop and a seat device being arranged in a displaceable lateral part forming a mobile wall such that the desktop and seat device automatically assume a working position in an extended position of the mobile wall.

8. The aircraft of claim 7, wherein a shelf, a waste paper basket with or without integrated shredder, an internet connection, a power outlet and safety devices are provided in at least one of the office module, the mobile wall or the at least one partition wall.

9. The aircraft of claim 1, wherein in the open state the at least one multifunctional disposition zone provides a work space for the flight attendants and includes a fold-out folding shelf guided in rails of the at least one partition wall or monument, the fold-out folding shelf being translatable into a working height and locked in an end position.

10. The aircraft of claim 9, wherein the folding shelf is supported on a cabin floor by an integrated support in a working or end position.

11. The aircraft of claim 9, wherein the folding shelf is extendable toward an opposite partition wall of the space unit by a linearly extendable auxiliary element, wherein a guide of the auxiliary element prevents a step in the region of a gap between the folding shelf and the auxiliary element.

12. The aircraft of claim 1, wherein at least individual variable or mobile elements of the space unit intended for creating the plurality of working areas are in the form of a modular interior fittings building blocks.

13. The aircraft of claim 1, wherein all variable or mobile elements of the space unit are equally structured and/or provided in the same color.

14. A method of converting a door entry or door exit area of an aircraft that is visually separated from the rest of a passenger cabin, into different working areas, comprising:
connecting a module comprising at least one mobile element to a partition wall or monument of the door entry area to form working areas, said at least one module being in the form of service and/or comfort facility for passengers or flight attendants;
wherein the module is configured to form a plurality of different working areas in the door entry area as a disposition zone; and
wherein the module is arranged in the door entry area in a space-saving and secure fashion during takeoff and landing phases of the aircraft;
wherein at least one multifunctional disposition zone is defined comprising the module and the door entry area for passengers and for flight attendants;
wherein the module of the multifunctional disposition zone assumes at least one of a closed state and an open state;

wherein in the open state of the module, the door entry area or door exit area is used as the multifunctional disposition zone while cruising such that the module at least partly obstruct the entry and exit through the door entry area or door exit area, and the multifunctional disposition zone forms different working areas in the form of service and/or comfort facilities for passengers or flight attendants during a flight phase;

wherein in the open state of the module, the multifunctional disposition zone is enclosed on one side by a door adjacent to the door entry area or door exit area for passengers and for flight attendants; and wherein in the closed state of the module, the at least one flexible, variable or mobile element is placed in a space-saving and secure fashion during takeoff and landing phases of the aircraft, and the multifunctional disposition zone forms an unobstructed entry and exit for the passengers into and out of the aircraft.

* * * * *